Figure 1:
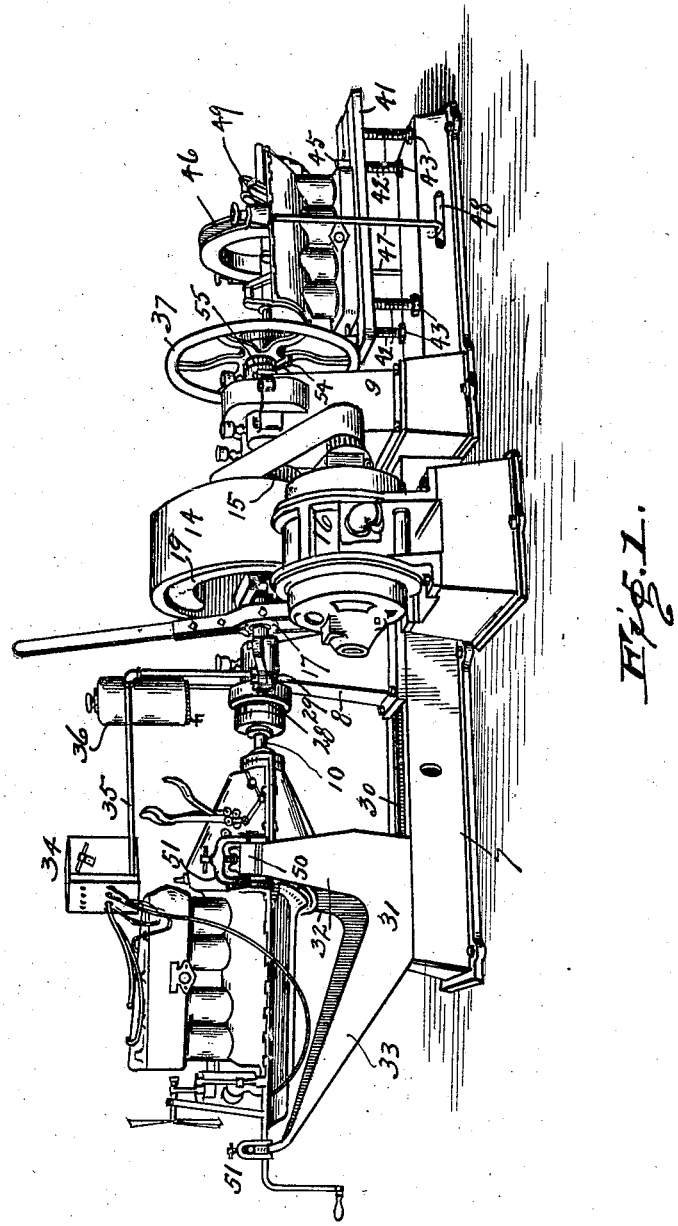

Apr. 17, 1923.

J. H. STALEY 1,452,446

ENGINE BEARING BURNING-IN AND RUNNING-IN MACHINE

Filed March 1, 1921      3 Sheets-Sheet 1

Inventor,
Joseph H. Staley,
By Joseph A. Minturn
Attorney.

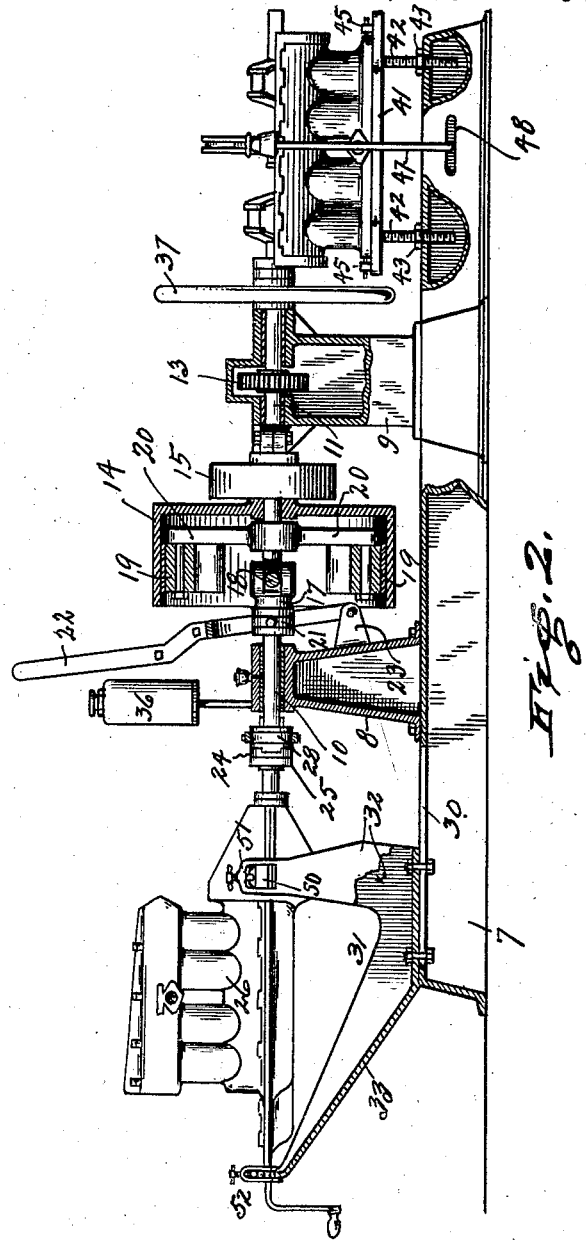

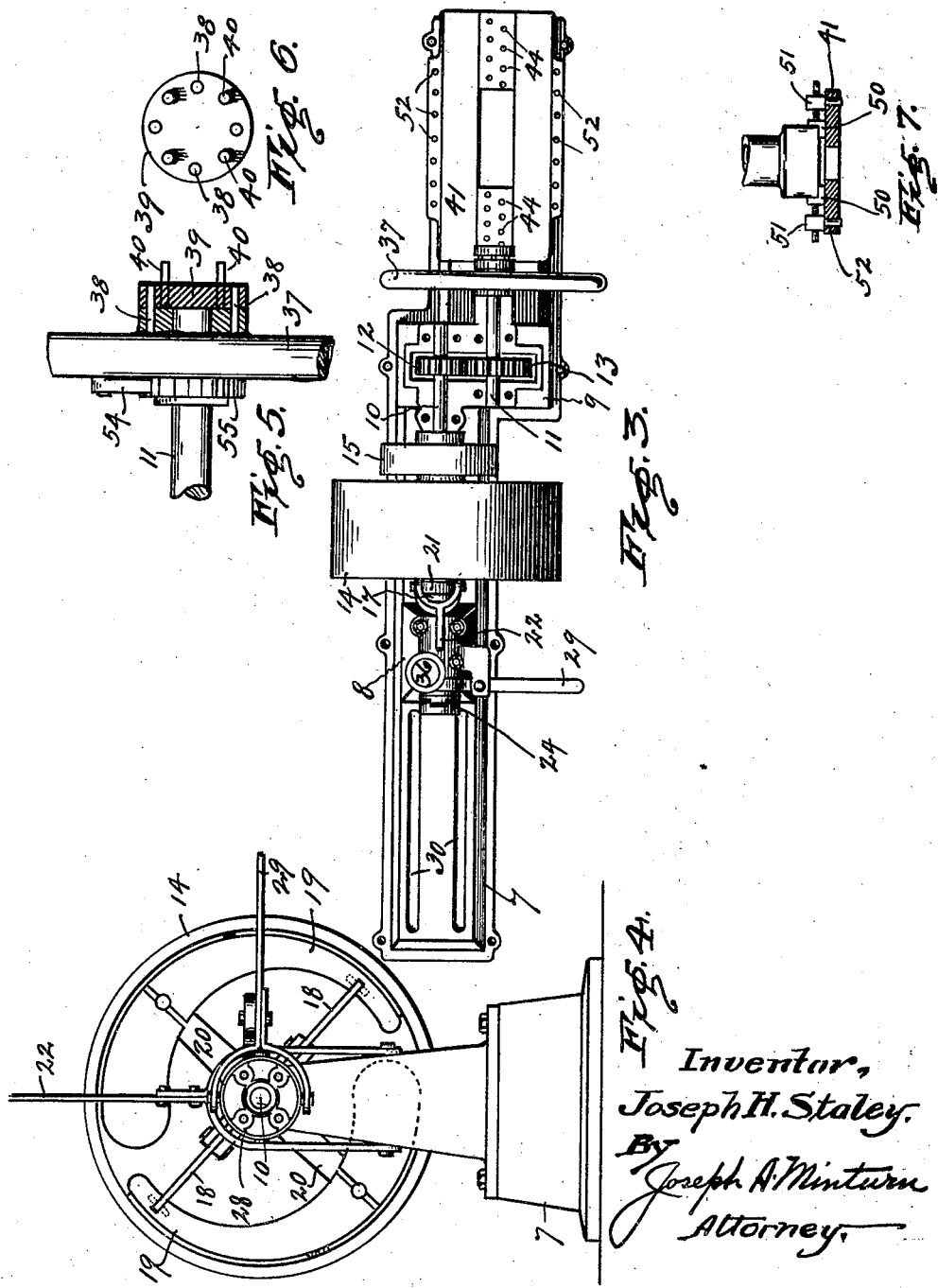

Patented Apr. 17, 1923.

1,452,446

UNITED STATES PATENT OFFICE.

JOSEPH H. STALEY, OF COLUMBUS, INDIANA.

ENGINE-BEARING BURNING-IN AND RUNNING-IN MACHINE.

Application filed March 1, 1921. Serial No. 448,876.

*To all whom it may concern:*

Be it known that I, JOSEPH H. STALEY, a citizen of the United States, residing at Columbus, in the county of Bartholomew and State of Indiana, have invented new and useful Improvements in Engine-Bearing Burning-in and Running-in Machines, of which the following is a specification.

The object of this invention is to provide a double-end machine adapted for burning-in the journal bearings of an engine at one end, and for running-in or smoothing and alining the journal-bearings of an engine at the other, in which machine the two ends are driven from the same source of power but preferably at different speeds, and always in the same direction as in use.

Another object of my invention is to dispense with special fixtures for the different motors by equipping the burning-in end of the machine with a universally adjustable plate to support the engine-block: that is, a plate adjustable for height as a whole and also independently at four corners to level and aline the crank-shaft of my machine, and a further object is to provide means for securing the engine-block at any required position on said plate.

A further object is to provide a pin-plate for the various types of motors, and means interchangeable at either end of the machine for connecting the machine with the pin-plate whereby a plurality of hardened pins are always in drive to eliminate the danger of shearing the pins.

A further object of my invention is to provide means on the running-end of my machine, to disengage the driving-shaft from the engine while testing the engine under its own power and for testing the various speeds of the engine transmission for noisy gears and bad bearings.

A further object is to provide a clutch of the balanced type that is durable and simple, will not slip under maximum strains and the weight of which will act as a balance wheel to conserve the power.

I accomplish the above, and other objects which will hereinafter appear, by the mechanism illustrated in the accompanying drawings, in which—

Figure 1 is a perspective view of my invention with an engine assembled on the running-in end and connected up to furnish the motive power, an inverted engine block on the burning-in end and an electric motor attachment for driving the machine when not driven by the engine on the running-in end of the machine. Fig. 2, is a side elevation and partial section of the mechanism of Fig. 1 without the electric motor attachment. Fig. 3 is a top plan view of the machine shown in Fig. 2, with the engine and engine block removed and with the cap off showing the two spur gears for reducing the speed of the burning-in end of the machine. Fig. 4 is an end elevation of the machine as seen from the running-in end. Fig. 5 is a detail in side elevation and part section of the adjusting-wheel hub and pin-plate at the burning-in end of the machine and Fig. 6 is a front view of the pin-plate removed. Fig. 7 is a cross section of the engine-block supporting plate at the burning in end of the machine showing the manner of elevating the block to avoid injury to its valves, and the clamping means associated therewith.

Like characters of reference indicate like parts in the several views of the drawings.

The bed 7 is preferably a one-piece cast iron body bolted to which toward its middle are spaced apart pedestals 8 and 9. That part of the bed which is between the pedestal 9 and the adjacent end of the bed is the burning-in end of the machine and is laterally offset a distance sufficient for the introduction of speed reducing gears between a main driving shaft 10, supported in suitable journals on pedestals 8 and 9, and its own drive-shaft 11, which is out of alinement with shaft 10 for such gear assembly. The pedestal 9 is consequently longer, that is, in its dimensions laterally of the bed to support both shafts 10 and 11, and is wide enough in its opposite dimensions for a gear recess in which pinion 12 on shaft 10 and spur gear wheel 13 on shaft 11 are assembled and for ample bearings for the shafts on each side of the gear wheels.

Mounted on the shaft 10 between the pedestals 8 and 9 is a clutch of the balanced type comprising a drum 14 open on one side to a cylindrical bore and closed on the other side by a web integral with a hub loosely mounted on shaft 10. On the hub is a fixed pulley 15, to which power is transmitted, here shown as from an electric motor 16. Mounted on shaft 10 in a manner to rotate therewith and to slide thereon is a sleeve 17 with diametrically opposite pairs of ears on the end closest to the drum in which the respective ends of bars 18, 18, are pivoted. The outer ends of the bars 18 are pivotally secured to the ends of curved shoes 19, 19, which shoes are pivotally supported by radial arms 20, 20, from a hub on the shaft 10. The outer end of the sleeve 17 has a circumferential channel in which a ring 21 is seated. This ring has trunnions which are engaged by the bifurcated end of a shifting lever 22, which lever is fulcrumed to ears 23 from the pedestal 8.

Mounted loosely on that end of shaft 10 which is at the running-in end of the machine, is a plate 24 with a plurality of holes adapted to receive pins on a disk 25 of a part that connects in with the driving portion of an engine 26 to be run on that end of the machine for alining and adjusting the engine journals. The plate 24 has a clutch-half formation on its side toward the pedestal 8, to engage with the clutch-face of a sleeve splined to the shaft 10. This sleeve has a circumferential channel in which a ring 28 is seated having trunnions engaged by the arms of a bifurcated shifting lever 29. The lever 29 is pivoted to a bracket extension from pedestal 8.

The top of the bed 7 at the running-in end of the machine has suitable slots 30 for the passage of bolts by which a cradle 31 is removably secured. The cradle is variously shaped and proportioned to suit the requirements for supporting the various makes of engines to be tested and corrected on this machine. The one here shown is for a popular make of engine and may be taken as typical in its general construction, comprising a pair of inner standards 32, 32, between which the transmission-end of the engine is clamped and slung, and a member 33, extending to receive and support the opposite or cranking end of the engine. If the engine supported by cradle 31 is to be run from its own power an electric current distributing box 34 is supported with a horizontal swinging adjustment by an arm 35 attached to the pedestal 8, and a tank 36 for gasoline is also supported on said pedestal.

The shaft 11 at the burning-in end of the machine carries a wheel 37 mounted fixedly on the shaft, in the outer face of the hub of which are a series of holes to receive hard steel pins 38, on a removable pin-plate 39. The plate 39 has the pins 38 and it also carries a series of pins 40. The plates 39 are thus removable and changeable for plates with pins to fit the requirements of disks on different engine blocks, which vary with the different makes of commercial engines.

The engine block to be burned-in is assembled upside down on my machine to make the shaft bearings accessible, and to accomodate the different designs and sizes of blocks and to level and adjust them properly I provide an adjustable bed plate 41, which is supported at each of its four corners on vertical screws 42. These pass through threaded holes in the top of bed 7 and have lock-nuts 43 resting on the top of bed 7, by which the plate 41 may be raised or lowered as a whole and locked, or by which each corner may be separately adjusted vertically. The plate 41 has a plurality of holes 44 to receive clamp-blocks 45 by which the engine block may be held at any required position on the plate 41. When the proper adjustment has been secured the block will be locked to the bed 7 by means of a clamp comprising preferably an arched bar 46, which is arched to avoid interference with the rotation of the cranks and which have end holes for bolts 47, 47, having lower end hooks to engage in slots 48 in the side of bed 7, and have screw threaded ends that pass through holes in the bar 46, and are retained and the bar tightened down to clamp the engine block to the bed 7 by nuts 49. When the blocks have exposed valves liable to injury by contact with plate 41 I lift them away by resting the block on a pair of angle bars 50, 50, and position the bars by abutting screws through blocks 51 bolted to holes 52 in plate 41, as shown in Fig. 7.

The operation of my invention is as follows: For burning in the bearings of an engine block the latter is placed upside down on the plate 41, on angle bars 50 as above described if need be, and plate 41 with the block is raised by rotating bolts 42 until the crank shaft is axially alined with shaft 11, this being supplemented by lateral adjustment of the block on the plate 41. The pins 40 on plate 39 will then register with and fit in the holes in the disk of the engine block, said plate 39 having been previously selected to fit with the disk on that particular engine block as previously described, and all danger of shearing the pins will be obviated, although the connection be a rigid one after the assembly is properly made. When the block has thus been adjusted and connected its position is immovably retained by properly placing the blocks 45 on the adjusted plate 41, and by use of bar 46 to clamp it. It is important, in adjusting the block on plate 41, to see that the crank shaft bears uniformly everywhere to avoid uneven fitting and burning-in out of balance. Such perfection in adjustment is easily obtainable by the means described. The wheel 37 acts as a flywheel and also as a hand wheel in rotating shaft 11 the required distance to bring the pins 40 into register with the holes in the disk on the shaft of the engine block and for testing the bearings after burning-in to see that they are not too tight. To this end the wheel is loosely mounted on shaft 11 and bears a dog 54 which engages a ratchet wheel 55 fixed to the shaft 11, and to rock the shaft in testing the bearings it is only necessary to lift the dog out of engagement with the ratchet wheel. If the bearings of the block are out of alinement through wear the block may still be positively held with its bearings alined with shaft 11. As the engines on the burning-in and running-in ends of the machine have their corresponding ends toward each other it is necessary to reverse the drive connection between them as I have provided for, to avoid running one of them backwards.

In the oil burnishing or running-in operation it is desirable to first work in the bearings under outside power; then run the engine for a final test under its own power. The suitable cradle 31 for the particular engine to be tested, is placed on the appropriate end of the bed 7, opposite the end of the shaft 10. The ears 50 on the casing are placed upon the standards 32, to which they are held by clamps 51. The front end of the crank shaft is placed on member 33, and there retained by screw clamp 52. As the cradle is made for that particular type of engine, very little adjusting is required to bring the crank-shaft of the engine into alinement with the shaft 10, but such as is necessary is afforded by the bolts that secure the cradle to base 7, and by blocking up under the ears 50, and on member 33, and adjusting the engine laterally on said members before the clamps and bolts are tightened. A special part to operate with the pin-plate 25 for the particular engine, is provided. The pin-plate operates in a manner similar to that described for plate 39, and its pins fit properly with the holes of plate 24. The special portion of the special part is squared, splined, or otherwise particularly formed to drivingly engage with the corresponding part of the type of engine to be operated on, and which vary in the different commercial makes. By means of the clutch-coupling controlled by hand-lever 29, the running-in end of the machine may be disconnected without stopping the operations at the burning-in end, or the engine may be run on its own power without carrying the load of the burning-in end. By closing the clutch-coupling here and disconnecting the shaft 10 from the motor 16 by opening the clutch controlled by hand-lever 22, the burning-in end of the machine may be also driven from the power of the engine at the running-in end. It is also possible to operate my invention by power furnished from an engine on the running-in end of the machine, thereby dispensing with other source of power such as the motor 16, but work can be turned out faster by having a source of power available outside of the engine on the running-in end of the machine because the stops for adjustments and corrections there and the change of engines after one is completed interferes with the operations at the burning-in end. It is obviously most economical and efficient to keep both ends of the machine busy constantly.

While I have here shown and described the best embodiment of my invention now known to me, it is apparent that the machine is capable of many variations without departing from the principles involved and I therefore do not desire to be limited more than is required by the appended claims.

I claim:

1. In a machine of the character specified, a base, a shaft journaled intermediate the ends of the base, a second shaft also journaled intermediate of the ends of the base but out of alinement with the first shaft, speed changing means connecting the two shafts, means to receive and hold an automobile engine in position with its crank shaft alined with said first shaft, means for operatively connecting said crank shaft and first shaft, means to receive and hold the block of an automobile engine with its crank shaft alined with the second shaft, and means for operatively connecting said last crank shaft and second shaft.

2. In a machine of the character specified, a base, a shaft journaled intermediate the ends of the base, a drum loosely mounted on the shaft, a clutch rotating with the shaft adapted to engage the drum and cause the drum to rotate with the shaft, a second shaft also journaled intermediate of the ends of the base but out of alinement with the first shaft, speed changing means connecting the two shafts, means to receive and hold an automobile engine in position with its crank shaft alined with said first shaft, means for operatively connecting said crank shaft and first shaft, means to receive and hold the block of an automobile engine with its crank shaft alined with the second shaft and means for operatively connecting said last crank shaft and second shaft.

3. In a machine of the character specified, a base, a support, a shaft journaled therein, a source of power, means for operatively connecting said source of power with and for disconnecting it from said shaft, a second shaft out of alinement with the first journaled in the support, speed changing gears connecting the two shafts, a universally adjustable plate means for clamping the block of an automobile engine on the last plate where its crank shaft may be alined with the second shaft, and means for operatively connecting the second shaft and crank shaft whereby power may be transmitted from the first shaft to the crank shaft of an automobile engine to burn the bearings in the block.

4. In a machine of the character specified, a base, a support, a shaft journaled therein, a source of power, means for operatively connecting said source of power with and for disconnecting it from said shaft, a second shaft out of alinement with the first shaft journaled in the support, speed changing gears connecting the two shafts, a pin means on the end of the second shaft, a second pin means attached to the first pin means, a universally adjustable plate, means for clamping the block of an automobile engine on the last plate where the crank shaft may be alined with the second shaft and having the holes in the disk on the crank shaft entered by the pins of the second pin means whereby power may be transmitted from the first shaft to the crank shaft of an automobile engine to burn the bearings in the block.

5. In a machine of the character specified, a base, a support, a shaft journaled therein, a source of power, means for operatively connecting said source of power with and for disconnecting it from said shaft, a second shaft out of alinement with the first shaft journaled in the support, speed changing gears connecting the two shafts, a wheel on the end of the second shaft having a plurality of pins holes in its hub a pin plate removably attached to the hub of the wheel, a universally adjustable plate, means for clamping the block of an automobile engine on the last plate where its crank shaft may be alined with the second shaft and having holes in a disk on the crank shaft entered by the pins of the second pin means whereby power may be transmitted from the first shaft to the crank shaft of an automobile engine to burn the bearings in the block.

6. In a machine of the character specified, a base, a support, a shaft journaled therein, a source of power, means for operatively connecting said source of power with and for disconnecting it from said shaft, a plate, a plurality of independent vertically adjustable means for adjusting the plate, and means for laterally adjusting and clamping the block of an automobile engine on the plate whereby with said plate adjusting means the crank shaft may be alined with said first shaft and power transmitted to the crank shaft to burn the bearings in the block.

7. In a machine of the character specified, a base, a support, a shaft journaled therein, a source of power, means for operatively connecting said source of power with and for disconnecting it from said shaft, clutch means on the shaft, manually operated means for controlling the clutch, a cradle supported by the base, means for securing an automobile engine on the cradle, means for adjusting the crank shaft of the engine into alinement with the first shaft, and means for operatively connecting the crank shaft of the engine with said first shaft subject to disconnection by means of said clutch.

8. In a machine of the character specified, a base, a support, a shaft journaled therein, a source of power, clutch controlled means for operatively connecting said source of power with said shaft, a clutch means remote from said last means mounted on the shaft, manually operated means for controlling the clutch, a cradle supported by the base on which an automobile engine is supported, means for adjusting the engine to aline its crank shaft with said first shaft, and multiple and selective pin plate means for operatively and rigidly connecting the crank shaft of the engine with the second clutch means.

9. In a machine of the character specified, a base, a support, a shaft journaled therein, a source of power, clutch controlled drum means operatively connecting said source of power with said shaft, a manually operatable clutch means on the shaft, a cradle selected for the particular type of engine to be operated on adjustably mounted on the base and supporting an automobile engine, means to adjust the engine to bring its crank into alinement with the first shaft, and selective pin plate means operatively connecting the crank shaft of the engine with the first shaft.

10. In a machine of the character specified, a base, a pair of pedestals on the base remote from its ends, a shaft journaled on both pedestals, a source of power drivingly connected with a drum, said drum being on the shaft, a balanced friction-clutch on the shaft cooperating with the drum, a second shaft journaled on one of the pedestals, and means for driving the two shafts at different speeds and in reverse directions.

11. In a machine of the character specified, a base, a pair of pedestals on the base remote from the ends of the base, a shaft journaled on both pedestals, means for drivingly connecting the crank shaft of an automobile engine mounted between one of the pedestals and its adjacent end of the base, with the first shaft, a second shaft journaled on one of the pedestals, a power transmission between the two shafts, means to support an engine block between the second shaft and its adjacent end of the machine, with its crank shaft alined with the second shaft, and means operatively connecting the two shafts.

12. In a machine of the character specified, a base, a shaft mounted thereon, a removable and adjustable cradle on the base to support an automobile engine, means to aline the crank shaft of the engine with said shaft, a second shaft driven in different direction from the first shaft, a clutch device between the engine and second shaft, and a means including a universally adjustable plate for supporting an engine block with a crank shaft therein in position to properly burn the bearings in the block.

13. In a machine of the character specified, a base, a shaft mounted thereon, a removable and adjustable cradle on the base to support an automobile engine, means to aline the crank shaft of the engine with said first shaft, a second shaft driven at a different rate from the first shaft, clutch device between the engine and second shaft, and a means including a plate supported by a plurality of independently adjustable height controlling means for supporting an engine block having a crank shaft therein in position to burn the bearings in the block.

14. In a machine of the character specified, a base, a shaft, means for rotating the shaft, a plate, a plurality of screws between the base and spaced apart portions of the plate to raise and lower the plate, means for coupling the shaft to the crank shaft of an engine block supported on the plate, and means to fasten the block immovably to the plate.

15. In a machine of the character specified, a base, a shaft, means for rotating the shaft, a second shaft driven in opposite direction from the first, means for mounting an engine on the base, means for connecting its shaft with the first shaft, means for mounting an engine block on the other end of the base, and means for connecting its shaft with the second shaft.

Signed at Columbus, Indiana, this the 21st day of February 1921.

JOSEPH H. STALEY.